Dec. 7, 1937.  R. N. BAUGHN  2,101,772
COMPOUND MASTER CYLINDER
Filed April 18, 1936
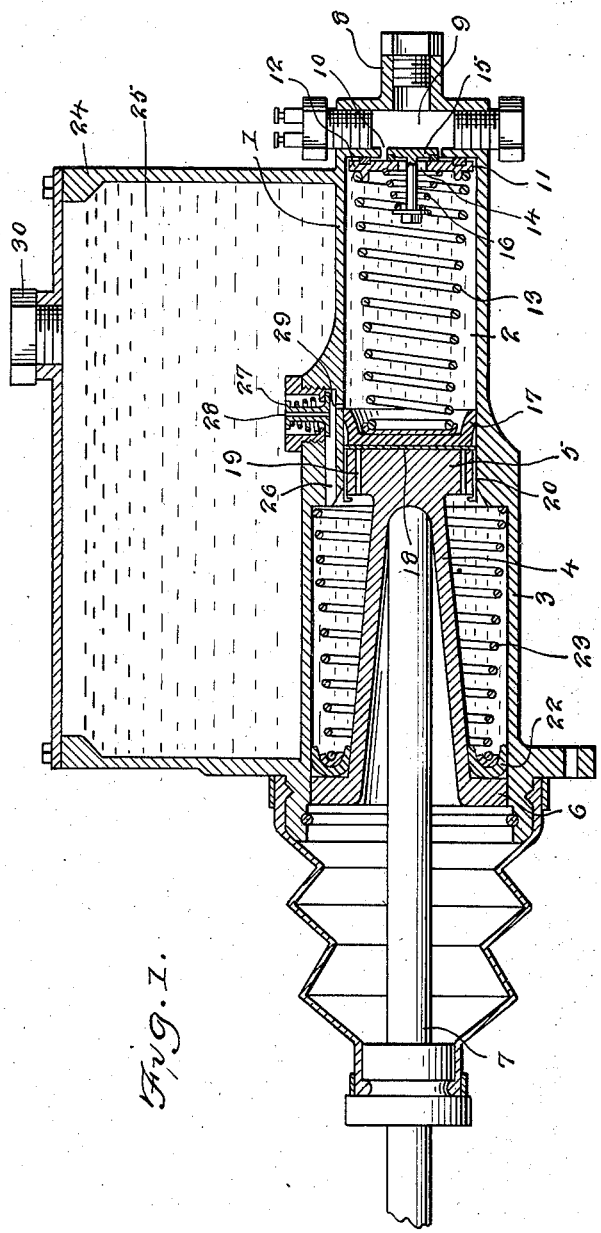
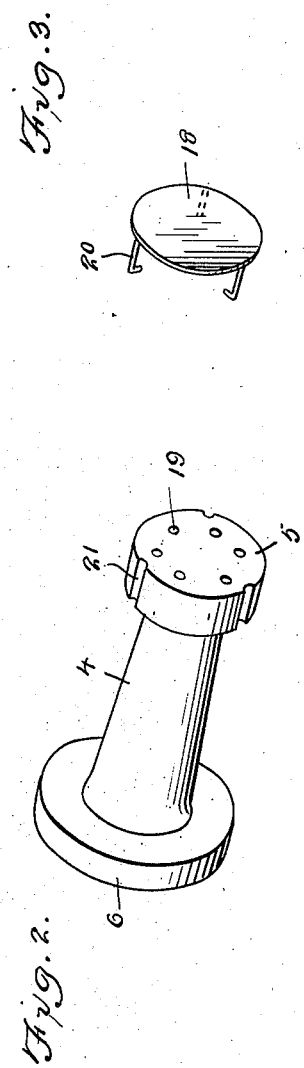
R. N. Baughn
INVENTOR
BY Victor J. Evans & Co.
ATTORNEY Patented Dec. 7, 1937

2,101,772

UNITED STATES PATENT OFFICE 2,101,772

COMPOUND MASTER CYLINDER

Roscoe N. Baughn, Conway, Ark.

Application April 18, 1936, Serial No. 75,193

2 Claims. (Cl. 60—54.6)

This invention relates to hydraulic braking systems and more particularly to a master cylinder and liquid supply reservoir therefor and has for the primary object the provision of a means for supplying a fluid pressure medium to the brake cylinders at a faster rate during initial operation of the brake force than during the pressure building stage of the braking action to rapidly take up slack in the system so as to provide maximum braking force at a minimum brake pedal force to eliminate the use of boosters or power brake means and providing a safer and easier operated device.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a combined master cylinder, piston therefor and fluid reservoir constructed in accordance with my invention.

Figure 2 is a perspective view illustrating the master piston.

Figure 3 is a perspective view illustrating a valve plate for one of the heads of the master piston.

Referring in detail to the drawing, the numeral 1 indicates a master cylinder having aligned communicative bores of different diameters to provide primary and secondary cylinders 2 and 3. A master piston 4 including integrally connected heads 5 and 6 operates within the primary and secondary cylinders 2 and 3, the head 5 being of a size to match the bore of the cylinder 2 while the head 6 is of a size to match the bore of the cylinder 3. The connecting portion of the master piston between the heads is recessed to receive the piston operating medium 7 to which is usually connected the pedal brake so that upon movement or depressing of the pedal brake the master piston will be advanced in the cylinders 2 and 3 to the right in Figure 1 for bringing about braking action of a hydraulic braking system (not shown).

One end of the cylinder 1 is equipped with a fitting 8 to connect with a hydraulic braking system and this fitting includes a chamber 9 having communication with the primary cylinder 2 by a port 10. Said port 10 is controlled by a double acting check valve 11. The check valve 11 includes a plate-like valve element 12 contacting an end wall of the cylinder 2 about the port 10 by the action of a coil spring 13 and has a centrally arranged port 14. A valve element 15 controls the port 14 of the valve plate 12 and is held in seated engagement with said valve plate 12 by a spring 16. The double acting check valve will permit a liquid to be forced from the primary cylinder into the hydraulic braking system and to be returned from the latter to the cylinder 2 when the pressure therein is reduced.

One end of the spring 13 seats in a cup-shaped piston 17 of the packing cup type operating in the primary cylinder 2 and receives its movement in one direction by the master piston 4 to force fluid from the primary cylinder 2 to the hydraulic braking system of the brake cylinders of said system.

A valve plate 18 operates between the cup-shaped piston 17 and the head 5 of the master piston and acts as a check valve for closing the ports 19 formed in said head 5. The ports 19 communicate the primary and secondary cylinders 2 and 3 when the pressure in the secondary cylinder exceeds the pressure in the primary cylinder. Fingers 20 are formed on the valve plate 18 and operate in grooves 21 formed in the head 5 and have hook-shaped ends for limiting the distance in which the valve plate may move away from the head 5 of the master piston. The master piston moving to the right in Figure 1, the head 5 thereof acts on the fluid in the primary cylinder overcoming the action of the spring 16 of the valve 15, opening the latter and admitting said fluid to the brake cylinders of the braking system and on the movement of the master piston to the left in Figure 1, the pressure to the braking system unseats the valve plate 12, opening the port 10 to allow the pressure in the braking system to become equal to the pressure in the primary cylinder.

The head 6 is engaged by a cup-shaped washer 22 which contacts the walls of the cylinder 3 and is held against said head 6 by a spring 23 seated against the shoulder formed in the cylinder 3.

Carried by or forming an integral part of the cylinder 1 is a reservoir 24 containing liquid 25 for the braking system and the cylinder 1. A passage 26 is formed in the cylinder 1 with one end in communication with the secondary cylinder 3 and the other end in communication with the reservoir 24. The passage 26 is controlled by a self-seating check valve 27 having a bypass port 28 therethrough maintaining the passage 26 always in communication with the reservoir to a limited extent. The passage 26 is also in communication with the primary cylinder 2 by an extremely small port 29 which becomes closed after the initial movement of the master piston to the right in Figure 1 or into brake applying position. The master piston when at rest or in non-brake applying position, the liquid may gravitate from the reservoir 24 into the cylinders 2 and 3 consequently filling said cylinders and should the master piston's movement to the left in Figure 1 be extremely rapid, the check valve 27 will open and permit the liquid 25 to flow freely into the secondary cylinder so as not to retard the movement of the master piston into non-brake applying position. The passage 28 is of a sufficient restricted nature as to allow building up of pressure in cylinder 3 as the piston 4 is moved forward.

The reservoir 24 may be easily filled through the removal of a plug 30, the latter preferably being of the vent type to place the liquid in the reservoir under atmospheric pressure.

In operation, the master piston to apply the brakes is moved to the right in Figure 1, through the usual depressing of the brake pedal (not shown). The initial movement of the piston in the direction stated causes the circulation of liquid from the secondary cylinder 3 to the primary cylinder 2 by way of the ports 19. This circulation continues until the pressure in the primary cylinder becomes equal to the pressure in the secondary cylinder and the valve plate 18 then closes the ports 19. The further movement of the master piston to the right compresses the fluid in the braking system, bringing about operation of the usual pistons in the brake cylinders of the braking system to apply the brakes. The initial movement of the piston bringing about equalization of the pressure in the primary and second cylinders is for the purpose of removing slack which may be in the braking system and after this slack is removed, the pressure is then built up in the system in the usual way with minimum effort on the part of the operator with maximum braking operation of the braking system. After the slack is taken up, the movement of the piston is less rapid than the initial movement and during such movement the small passage 28 will provide sufficient relief means for the fluid in cylinder 3 ahead of the piston 4 after the ports 19 are closed off by the plate 18. After ports 19 are closed the greater portion of the brake applying effort acts on the smaller piston 5 and, therefore, there is a high braking pressure in cylinder 2.

Having described the invention, I claim:

1. A brake operating means for hydraulic braking systems comprising a master cylinder including bores of different diameters forming primary and secondary cylinders, a master piston operating in the master cylinder and including integrally connected heads of a size to match the bores of the primary and secondary cylinders, means for connecting the primary cylinder of the master cylinder to a hydraulic braking system, a double acting check valve for said last means and including a spring, one of the heads of the master piston having ports to place the primary and secondary cylinders in communication, a check valve plate controlling said ports and slidably supported by said last-named head, a cup-type piston operating in the primary cylinder and held against the plate valve by said spring, an operating means connected to the master piston, a reservoir carried by the master cylinder, said master cylinder having a passage communicating the primary and secondary cylinders with the reservoir, and a check valve operating in said passage for preventing flow towards the reservoir and having a restricted passage therethrough maintaining communication between the secondary cylinder and the reservoir at all times.

2. A brake operating means for hydraulic braking systems comprising a master cylinder including bores of different diameters forming primary and secondary cylinders, a master piston operating in the master cylinder and including integrally connected heads of a size to match the bores of the primary and secondary cylinders, means for connecting the primary cylinder of the master cylinder to a hydraulic braking system, a double acting check valve for said last means and including a spring, one of the heads of the master piston having ports to place the primary and secondary cylinders in communication, a check valve plate controlling said ports and slidably supported by said last-named head, a cup-type piston operating in the primary cylinder and held against the plate valve by said spring, an operating means connected to the master piston, a reservoir carried by the master cylinder, said master cylinder having a passage communicating the primary and secondary cylinder with said reservoir, a check valve operating in said passage for preventing flow towards the reservoir and having a restricted passage therethrough maintaining communication between the secondary cylinder and the reservoir at all times, a cup-shaped washer carried by the master piston and operating upon the walls of the secondary cylinder, and a spring engaging the last-named cup-shaped washer.

ROSCOE N. BAUGHN.